US006979892B2

(12) United States Patent
Li et al.

(10) Patent No.: US 6,979,892 B2
(45) Date of Patent: *Dec. 27, 2005

(54) LAMINATED CO-FIRED SANDWICHED ELEMENT FOR NON-THERMAL PLASMA REACTOR

(75) Inventors: Bob Xiaobin Li, Grand Blanc, MI (US); David Kwo-Shyong Chen, Rochester Hills, MI (US); Joachim Kupe, Davisburg, MI (US); David Emil Nelson, Independence Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 219 days.

This patent is subject to a terminal disclaimer.

(21) Appl. No.: 10/128,536

(22) Filed: Apr. 23, 2002

(65) Prior Publication Data

US 2002/0174938 A1 Nov. 28, 2002

Related U.S. Application Data

(60) Provisional application No. 60/286,611, filed on Apr. 25, 2001.

(51) Int. Cl.[7] .......................... H01L 23/20; H05K 1/03; H05K 5/06; B01J 19/08

(52) U.S. Cl. ...................... 257/682; 257/703; 174/255; 174/256; 361/758; 361/792; 361/795; 422/186

(58) Field of Search ................................ 174/255, 258; 361/792, 795; 257/700, 701, 703; 428/210; 422/186, 177, 186.04, 193; 156/89.12, 89.16

(56) References Cited

U.S. PATENT DOCUMENTS

| | | | | |
|---|---|---|---|---|
| 4,551,629 A | * | 11/1985 | Carson et al. | 250/208.2 |
| 4,576,799 A | * | 3/1986 | Worner et al. | 422/176 |
| 4,868,712 A | * | 9/1989 | Woodman | 361/689 |
| 5,028,473 A | * | 7/1991 | Vitriol et al. | 428/137 |
| 5,171,341 A | * | 12/1992 | Merry | 55/484 |
| 5,510,088 A | * | 4/1996 | Aklufi | 422/186.05 |
| 5,517,057 A | * | 5/1996 | Beilstein et al. | 257/686 |
| 5,579,207 A | * | 11/1996 | Hayden et al. | 361/790 |
| 5,744,827 A | * | 4/1998 | Jeong et al. | 257/686 |
| 5,746,051 A | * | 5/1998 | Kieser et al. | 60/275 |
| 6,039,816 A | * | 3/2000 | Morita et al. | 134/19 |

(Continued)

FOREIGN PATENT DOCUMENTS

WO  WO02078838  *  2/2002

*Primary Examiner*—Alonzo Chambliss
(74) *Attorney, Agent, or Firm*—Paul L. Marshall (57) ABSTRACT

A method for preparing a non-thermal plasma reactor substrate includes disposing electrical vias on green stage first and second ceramic plates; filling the electrical vias with conductive material; and forming electrical contact via cover pads; disposing conductive material on the first ceramic plate to form an electrode plate having a main electrode portion and a terminal lead for electrically connecting the main electrode portion to the electrical vias; laminating the electrode plate and the second ceramic plate together, embedding the electrode therebetween; co-firing the plates to form a laminated co-fired embedded-conductor element; stacking a plurality of the laminated co-fired embedded-conductor elements to form a multi-cell stack, the filled electrical vias aligning in the stack to provide an electrical bus for connecting alternating elements in the stack; and disposing spacers with matching vias and via cover pads between adjacent pairs of elements to form exhaust gas passages.

14 Claims, 8 Drawing Sheets

U.S. PATENT DOCUMENTS

| | | |
|---|---|---|
| 6,368,451 B1 | 4/2002 | Goulette et al. |
| 6,423,190 B2 * | 7/2002 | Hemingway et al. ........ 204/164 |
| 6,464,945 B1 * | 10/2002 | Hemingway ................ 422/174 |
| 6,482,368 B2 | 11/2002 | Hemingway et al. |
| 6,537,507 B2 * | 3/2003 | Nelson et al. .............. 422/186 |
| 6,545,228 B2 * | 4/2003 | Hashimoto .................. 174/260 |
| 6,692,704 B2 * | 2/2004 | Nelson et al. ......... 422/186.04 |
| 6,800,256 B2 * | 10/2004 | Nelson et al. .............. 422/174 |
| 6,838,058 B2 * | 1/2005 | Nelson .................. 422/186.04 |
| 2005/0079112 A1 * | 4/2005 | Li et al. ................ 422/186.03 |

* cited by examiner

LAMINATED CO-FIRED SANDWICHED ELEMENT FOR NON-THERMAL PLASMA REACTOR

CROSS-REFERENCE TO RELATED APPLICATIONS

The present application claims priority to U.S. Provisional Application Ser. No. 60/286,611, of Bob X. Li, et al., filed Apr. 25, 2001, entitled "Laminated Co-Fired Sandwiched Element for Non-Thermal Plasma Reactor," which is hereby incorporated by reference herein in its entirety.

TECHNICAL FIELD

This invention relates to non-thermal plasma reactors for treating nitrogen oxide emissions in automotive exhaust gases.

BACKGROUND OF THE MENTION

A non-thermal plasma reactor for use with diesel engines and other engines operating with lean air fuel mixtures is disclosed in commonly assigned U.S. patent application Ser. No. 09/465,073, filed Dec. 16, 1999, entitled "Non-thermal Plasma Exhaust NOx Reactor," which is hereby incorporated by reference herein in its entirety. Disclosed therein is a reactor element comprising high dielectric, nonporous, high temperature insulating means defining a group of relatively thin stacked cells forming gas passages and separated by the insulating means. Alternate ground and charge carrying electrodes in the insulating means on opposite sides of the cells are disposed close to, but electrically insulated from, the cells by the insulating means. The electrodes may be silver or platinum material coated onto alumina plates. Conductive ink is sandwiched between two thin nonporous alumina plates or other suitable insulating plates to prevent arcing while providing a stable electrode spacing for a uniform electric field. The electrodes are coated onto alumina in a pattern that establishes a separati between the electrodes and the connectors of alternate electrodes suitable to prevent voltage leakage.

U.S. Pat. No. 6,338,827 to Nelson et al., commonly assigned, entitled "Stacked Shape Plasma Reactor Design for Treating Auto Emissions," which is hereby incorporated by reference herein in its entirety, discloses a non-thermal plasma reactor element prepared from a planar arrangement of formed shapes of dielectric material. The shapes are used as building blocks for forming the region of the reactor wherein the plasma is generated. Individual cells are provided with a conductive print disposed on a formed shape to form electrodes and connectors. In a preferred embodiment, the conductive print comprises a continuous grid pattern having a cutout region disposed opposite the terminal connector for reducing potential charge leakage. Multiple cells are stacked and connected together to form a multi-cell reactor element.

Commonly assigned U.S. patent application Ser. No. 09/517,681, filed Mar. 2, 2000 entitled "Plasma Reactor Design for Treating Auto Emissions—Durable and Low Cost," which is hereby incorporated by reference herein in its entirety, discloses a non-thermal plasma reactor element for conversion of exhaust gas constituents. The reactor comprises an element prepared from an extruded monolith of dense dielectric material having a plurality of channels separated by substantially planar dielectric barriers. Conductive material printed onto selected channels forms conductive channels that are connected along bus paths to form an alternating sequence of polarity, separated by exhaust channels. Conductive channels and channels not selected for exhaust flow are plugged at end portions of the monolith with a material suitable for excluding exhaust gases and preventing electrical charge leakage between conductive channels. Exhaust channels, disposed between opposite polarity conductive channels, are left uncoated and unplugged. During operation, exhaust gas flows through channels and is treated by the high voltage alternating current plasma field. The planar shape of the dielectric barriers provides a uniform electrical response throughout the exhaust channels.

U.S. Pat. No. 6,354,903 to Nelson et al., commonly assigned, entitled "Method of Manufacture of a Plasma Reactor with Curved Shape for Treating Auto Emissions," which is hereby incorporated by reference herein in its entirety, discloses a non-thermal plasma reactor element wherein a swept shape substrate is formed and treated to create a non-thermal plasma reactor element. The substrate is formed via extrusion so that there is a series of nested, concentric dielectric barriers. Selected channels are coated with conductive material to form conductor channels capable of forming an electric field around exhaust channels. Conductive channels and channels not selected for exhaust flow are plugged at end portions of the monolith with a material suitable for excluding exhaust gases and preventing electrical charge leakage between conductive channels. Exhaust channels, disposed between opposite polarity conductive channels, are left uncoated and unplugged.

U.S. Provisional Application No. 60/249,231, of David E. Nelson, et al., filed Nov. 16, 2000, entitled "Edge-connected Non-thermal Plasma Exhaust After Treatment Device," which is hereby incorporated by reference herein in its entirety, discloses an edge-connected non-thermal plasma reactor substrate including an edge-connected frame comprising a pair of dielectric edge connectors secured at opposite ends to first and second outer dielectric plates. The dielectric edge connectors comprise a backplane and a plurality of tines protruding along at least one major surface of the backplane, the plurality of tines being spaced apart from one another at regular intervals so as to form pockets between adjacent tines. A plurality of alternating polarity electrode plates are disposed within the edge-connected frame in an alternating polarity arrangement that defines the presence of at least one dielectric barrier next to a plasma cell with the pockets compliantly engaging opposite ends of the electrode plates.

While the above-described non-thermal plasma reactors meet some of the current needs and objectives in the art, there remain several issues that need to be more effectively addressed.

Figure 1:
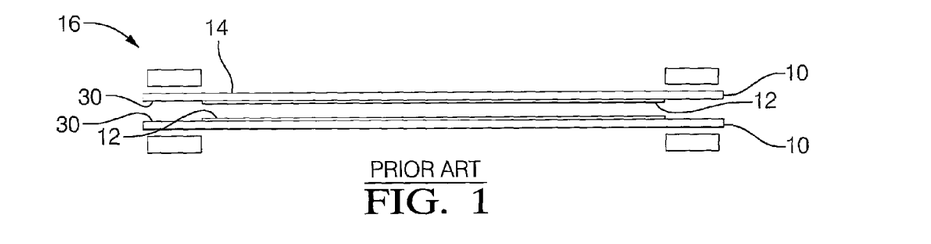
FIG. 1 (Prior Art) is an exploded view showing two separate electrode plates forming a two-plate element.
Figure 2:
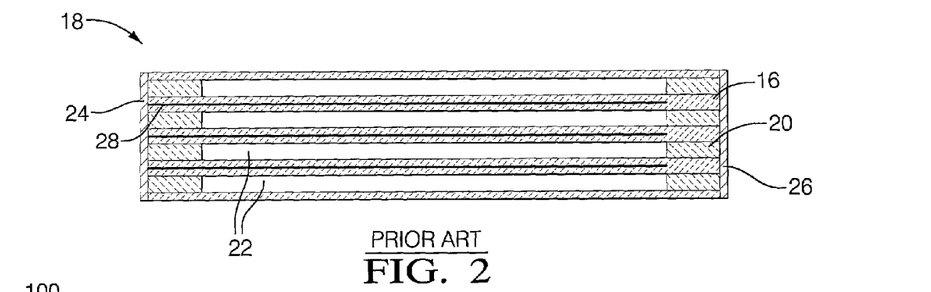
FIG. 2 (Prior Art) shows a multi-cell substrate comprising a plurality of the two separate plate elements of FIG. 1.

As illustrated in prior art FIGS. 1 and 2, elements for planar stacked plate non-thermal plasma reactor substrates are generally prepared by printing two individual dielectric (typically alumina) plates 10 with a metal conductor 12, drying each printed plate 14 and firing each printed plate 14 separately. Two separately fired printed plates 14 are stacked together having the metal conductors 12 sandwiched therebetween and stacked to form a two-plate substrate element 16 (exploded in FIG. 1 to show detail).

A multi-cell substrate 18, shown in FIG. 2, is prepared using a plurality of two-plate elements 16 having discrete spacers 20 placed so as to form multi-channel exhaust gas passages 22. Power and ground bus lines 24, 26 are established at the sides of the stack 18 to connect the alternating polarity two-plate elements 16 to power and ground connections (not shown). Exhaust gas passes through the exhaust gas passages 22 and is treated therein by the corona.

A problem arises with this construction method in that the two electrode printed plates 14 used to form the two-plate element 16 present a parting line gap (or conductor boundary line gap) 28 between the faying surfaces 30 of the two electrode plates 14 in the same plane as the metal conductor 12. The parting line gap 28 may be further increased by plate camber and thickness variation in the plates 10. Exhaust gas can penetrate the conductor boundary line gap 28 and contaminate the metal conductor 12. NOx conversion efficiency can be negatively affected even with a slight boundary gap due to gas by-pass between plates. Methods to prevent electrode contamination include, for example, coating the electrode surface with glass adhesive, bonding the two plates 14 together with glass adhesive and sealing the boundary line gap 28 with a sealant. However, such an approach increases processing costs and has unproven durability.

The dielectric plates 10 are very thin and fragile, having a typical plate 10 thickness in the range of about 0.25 millimeters to about 0.50 millimeters. Plate breakage can occur at high vehicle exhaust gas flow rates, especially under hard acceleration driving conditions. As high velocity gas passes through the narrow exhaust gas passages 22, Bernoulli-type lifting forces are generated toward the surfaces of the thin plates 10. This pressure causes the two-plate elements 16 to deflect and, in some cases, crack. The two-plate elements 16 may be strengthened by, for example, increasing the plate 10 thickness or reducing the parting line gap 28 span by using additional interior supports.

Further, the two-plate element 16 construction is prone to bus line arcing due to the parting line gap 28. Currently, several printing processes are employed to establish the bus lines 24, 26. A thick film metallic ink is used to fill the parting line gap 28 and make the connection between the two plates 14. As the reactor operates in a variable exhaust temperature range, thermal expansion and contraction of the ceramic plates 14 can cause the inked bus line 24, 26 to crack at the parting line, resulting in bus line arcing.

In an open space, opposite polarity plates must be separated from one another by a minimum of about 19 millimeters to prevent electrical arcing. Due to the parting line gap 28 existing between the two plates, current planar reactors separate the edge of the electrode from the edge of the dielectric plate 10 by about 19 millimeters to prevent arcing of one electrode to the opposite polarity bus line. This effectively reduces the potential active area of the electrode available to treat exhaust gas by the same amount.

Further, the fabrication of two-plate element 16 stacked planar reactors is complex and costly due to the substantial fixturing required to align pieces during assembly. For example, special fixturing is required to hold each discrete spacer in place relative to the plates.

What is needed in the art is an improved non-thermal plasma reactor substrate and process for preparing a non-thermal plasma reactor substrate.

SUMMARY OF THE INVENTION

A non-thermal plasma reactor multi-cell substrate having a laminated co-fired embedded-conductor element and methods for preparing the substrate are provided. The non-thermal plasma reactor multi-cell substrate comprises a plurality of laminated co-fired embedded-conductor elements arranged to provide a multi-cell stack of alternating polarity laminated co-fired embedded-conductor elements; and spacers disposed between adjacent pairs of the laminated co-fired embedded-conductor elements to form exhaust gas passages thereby providing a laminated co-fired embedded-conductor element non-thermal plasma reactor multi-cell substrate. As used herein, co-firing means firing the metal electrode printed on the green ceramic plate and the second matching green ceramic plate at the same time to form the single co-fired embedded-conductor element.

A first embodiment of the present method for preparing a non-thermal plasma reactor substrate having electrical connection provided by conductive vias comprises:

disposing electrical vias and alignment apertures on first and second ceramic plates when the first and second ceramic plates are in the green stage;

filling the electrical vias with conductive material;

disposing conductive material around vias on the first and second ceramic plates to form electrical contact via cover pads;

disposing conductive material on the first ceramic plate to form an electrode plate having a main electrode portion and a terminal lead for electrically connecting the main electrode portion to the electrical vias;

drying the conductive material;

laminating the electrode plate and the second ceramic plate together, the electrode being sandwiched between the electrode plate and the second ceramic plate to form a laminated embedded-conductor element;

co-firing the laminated embedded-conductor element;

stacking and bonding a plurality of the laminated co-fired embedded-conductor elements to form a multi-cell stack of alternating polarity laminated co-fired embedded-conductor elements, the filled electrical vias aligning in the stack to provide an electrical bus for connecting alternating elements in the stack; and disposing spacers with matching vias and via cover pads between adjacent pairs of the laminated embedded-conductor elements to form exhaust gas passages thereby providing a laminated co-fired embedded-conductor non-thermal plasma reactor multi-cell substrate.

Optionally, in accordance with the first embodiment, electrical connection is provided through a side terminal, the process comprising:

disposing alignment apertures on first and second ceramic plates when the first and second ceramic plates are in the green stage;

disposing conductive material on the first ceramic plate to form an electrode plate, with the conductive material forming a main electrode portion and at least one terminal lead such as first and second terminal leads extending from opposite sides of the main electrode portion to opposite side edges of the electrode plate and further extending over the opposite side edges of the electrode plates;

drying the conductive material;

laminating the electrode plate and the second ceramic plate together, the electrode being sandwiched between the electrode plate and the second ceramic plate to form a laminated embedded-conductor element, disposing conductive material along side edges of the element to provide a side terminal connecting to bus leads;

drying the conductive material;

co-firing the laminated embedded-conductor element;

stacking and bonding a plurality of laminated co-fired embedded-conductor elements to form a multi-cell stack of alternating polarity laminated co-fired embedded-conductor elements;

disposing spacers or edge connectors between adjacent pairs of laminated co-fired embedded-conductor elements to form exhaust gas passages thereby providing a laminated co-fired embedded-conductor non-thermal plasma reactor multi-cell substrate.

A second embodiment of the present process for preparing a non-thermal plasma reactor substrate comprises:

disposing electrical vias and alignment apertures on first and second ceramic plates when the first and second ceramic plates are in the green stage;

filling the electrical vias on the first and second ceramic plates with conductive material;

disposing conductive material on the first and second ceramic plates around the vias to form electrical contact via cover pads;

disposing conductive material on the first ceramic plate to form an electrode plate having a main electrode portion and a terminal lead for electrically connecting the main electrode portion to the electrical vias;

disposing electrical vias and alignment apertures on two or more spacers when the spacers are in the green stage;

filling the electrical vias on the spacers with conductive material disposing conductive material on the spacers around vias to form electrical contact cover pads;

drying the conductive material;

laminating the electrode plate, the second ceramic plate and the spacers together, the electrode being sandwiched between the electrode plate and the second ceramic plate and the spacers being disposed so as to form a laminated co-fired embedded-conductor shaped element such as a "C" or "I" shaped element;

stacking and bonding a plurality of laminated co-fired embedded-conductor shaped elements to form a multi-cell stack of alternating polarity laminated co-fired embedded-conductor elements, with the filled electrical vias aligning in the stack to provide an electrical bus for connecting alternating polarity laminated co-fired embedded-conductor elements.

A third embodiment of the present process for preparing a non-thermal plasma reactor substrate comprises:

disposing electrical vias and alignment apertures on first and second ceramic plates when the first and second ceramic plates are in the green stage;

filling the electrical vias on the first and second ceramic plates with conductive material prior to or after laminating the entire substrate stack;

disposing conductive material on the first ceramic plate to form an electrode plate having a main electrode portion and a terminal lead for electrically connecting the main electrode portion to the electrical vias;

disposing conductive material on the second ceramic plate around the vias to form electrical contact cover pads;

disposing electrical vias and alignment apertures on two or more spacers when the spacers are in the green stage;

filling the electrical vias on the spacers with conductive material prior to or after laminating the entire substrate stack;

disposing conductive material on the spacers around vias to form electrical contact cover pads;

drying the conductive material;

stacking the electrode plate and the second ceramic plate together, the electrode being sandwiched between the electrode plate and the second ceramic plate to form a sandwiched embedded-conductor element;

inserting temporary supports or fugitive material between adjacent pairs of laminated embedded-conductor elements to form temporary exhaust gas passages between adjacent pairs of laminated embedded-conductor elements forming the multi-cell stack;

disposing said spacers having matching vias and via cover pads between adjacent pairs of said laminated embedded-conductor elements to form exhaust gas passages between adjacent pairs of said laminated embedded-conductor elements in the multi-cell stack;

laminating the multi-cell stack;

removing the temporary supports;

and co-firing the multi-cell stack to form a laminated co-fired embedded-conductor non-thermal plasma reactor multi-cell substrate. The filling of vias with conductive material may be performed after laminating the entire substrate stack to reduce the number of printings for via cover pads.

The reactor substrates provide increased mechanical durability over previous designs. As used herein, the term "ceramic plates" includes, but is not limited to, ceramic plates comprising cast ceramic tapes or roll compacted ceramic tape. By combining two ceramic plates, one being printed with an electrode pattern, and laminating them to form one integrated element, the ceramic plate structure is stiffened without increasing overall plate thickness. Most advantageously, the parting line gap that exists between two separate contacting plates in previous designs is eliminated. Ultimately, the present invention eliminates the deflecting force created by the exhaust gas flow penetrating into the gap between two contacting plates. Tapered edges in the front of the laminated plates reduce flow restriction.

The present invention embeds the electrode and seals the electrode inside the ceramic plates, thereby protecting the electrode from contamination by exhaust gas. This also prevents any potential for untreated exhaust gas by-pass through the gap.

The present invention increases reactor volumetric conversion efficiency by removing the requirement that the positive conductor and ground conductor be separated by a 19 millimeter distance to prevent arcing as previously required. By burying the electrode completely inside the ceramic dielectric barrier (laminated embedded-conductor element), the distance between the positive conductor and ground conductor can be significantly reduced. This allows a greater volumetric area to be used to treat exhaust gas or a reduction in the number of cells (exhaust gas passages) required to treat the gas, thereby achieving material savings over previous designs.

Electrical bus line robustness is achieved by using internal vias for electrical connection ensuring a good electrical contact between each laminated co-fired embedded-conductor element in the substrate stack. The invention simplifies the process of preparing the electrical connection to the high voltage feed device and ground connection.

These and other features and advantages of the invention will be more fully understood from the following description of certain specific embodiments of the invention taken together with the accompanying drawings.

BRIEF DESCRIPTION OF THE DRAWINGS

Referring now to the drawings, which are meant to be exemplary, not limiting, and wherein like elements are numbered alike in the several Figures.

DESCRIPTION OF THE PREFERRED EMBODIMENT

Figures 3, 4:
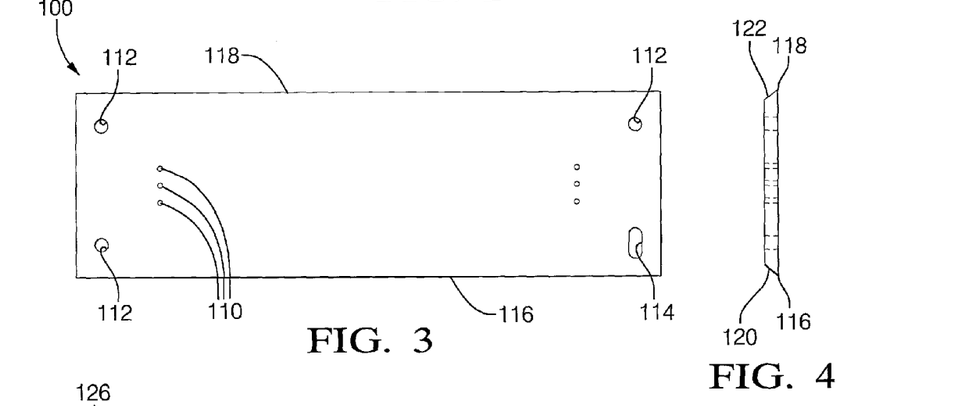
FIG. 3 is a top view of a cast ceramic tape or roll compacted ceramic plate showing electrical vias, alignment apertures, and error proofing features.
FIG. 4 is an illustrative view of a cast ceramic tape or roll compacted ceramic plate having tapered edges in accordance with a preferred embodiment of the present invention.
Figure 5:
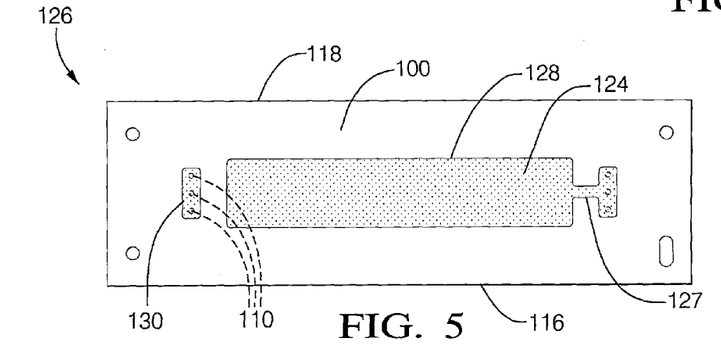
FIG. 5 shows an electrode plate prepared with the cast ceramic tape or roll compacted ceramic plate of FIG. 3, using vias as electrical connections.

Turning now to the drawings, FIGS. 3–5 depict a cast ceramic tape or roll compacted ceramic plate 100 (hereinafter ceramic plate 100) at the green stage. Depending on the application temperature of the reactor, the ceramic plate 100 can be a High Temperature Co-fired Ceramic (HTCC) material, or a Low Temperature Co-fired Ceramic (LTCC) material. For high temperature application, the preferred plate material is alumina, although other material such as cordierite, mullite, and aluminum nitride, among others, can be used. The conductive material for HTCC material may be any high temperature resistant conductive material including, but not limited to, tungsten, nickel, molybdenum, and platinum. For low temperature application, LTCC material, such as glass ceramics can be used. The conductive material for LTCC material may be, but is not limited to, silver, palladium/silver, gold, or copper. One or more layers of the ceramic tape 100 can be laminated together to form the thickness required to achieve the desired dielectric strength. Electrical vias 110, alignment apertures 112, and error-proofing features 114 are pre-formed on the ceramic plate 100 at the green stage. Error-proofing features 114 ensure proper substrate assembly after ceramic plates 100 are laminated and fired. Error-proofing features 114 include, but are not limited to, holes, slots, or chamfers to positively identity the position of the electrical terminal.

In a preferred embodiment, edges 116, 118 of the ceramic plate 100 are tapered so as to facilitate exhaust gas flow by reducing substrate flow restriction, particularly by reducing flow pressure created on the leading edge 116. FIG. 4 is a representation showing leading tapered edge 120 and outlet tapered edge 122, said edges 120 and 122 being tapered in relation to the lamination surface, away from this surface such that when two tapes are laminated together, the leading edges form a bullet shape.

Conductive material, such as conductive ink, is applied to a major surface of the ceramic tape or plate 100 forming electrode 124. As shown in FIG. 5, an electrode pattern is applied to the ceramic plate 100 such as by screen printing a conductive ink onto the surface of the ceramic plate 100 to form electrode plate 126. The ink pattern includes a terminal lead 127 for electrically connecting the main electrode portion 124 to electrical vias 110 forming bus lines for connecting alternating elements in the stack. The symmetrical nature of the ink pattern allows use of a single electrode ink pattern to create the two opposite polarity electrode elements.

By embedding the electrode 124 inside the dielectric barriers, the positive electrode and ground electrode need not be separated by a distance of at least about 19 millimeters (to prevent arcing) as previously required. The present invention allows the edge 128 of the electrode 124 to extend to within about 5 millimeters of the edges 116, 118 of the ceramic tape or plate 100 creating greater volumetric area to treat exhaust gas and reducing the total number of cells required to treat the gas. This increases reactor efficiency while providing significant cost reduction.

Figure 6:
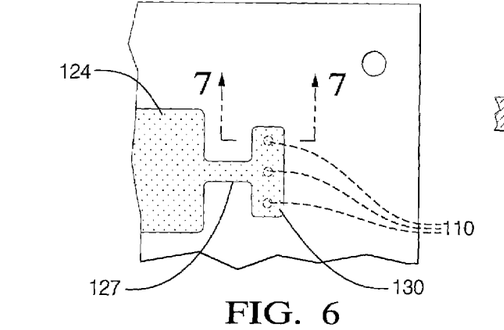
FIG. 6 is an enlargement of the portion of FIG. 5 showing the electrical vias and inked pad.
Figure 7:
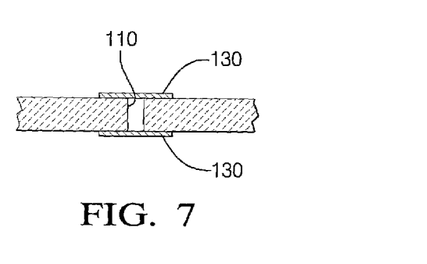
FIG. 7 is a cross-sectional view of a portion of FIG. 6 showing the inked via cover pad for making electrical contact from one plate to another plate.

As further shown in FIGS. 6 and 7, conductive ink is printed around the electrical vias 110 to form terminal lead 127 and inked via cover pads 130 for enhancing electrical contact between adjacent elements. Pads 130 provide a solid electrical contact between adjacent ceramic plates 100 and sustain electrical contact in the face of thermal expansion and contraction as the reactor operates in a variable exhaust temperature range. Further, the inked cover pads 130 provide increased compliance in response to plate 100 dimensional variation.

Figure 8:
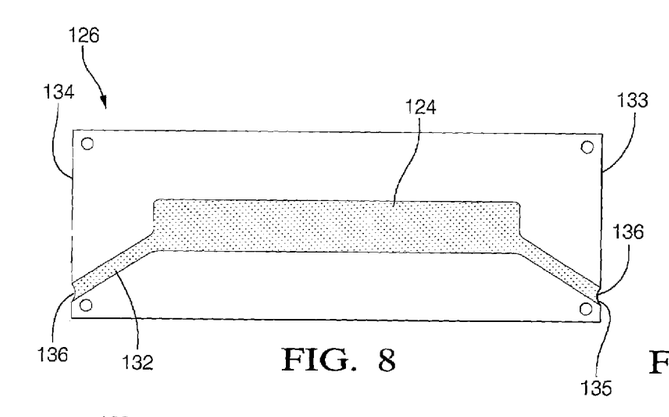
FIG. 8 shows an alternate embodiment electrode plate having an electrode pattern including terminal leads extending to the edge of the plate for electrical connection to a side terminal.
Figure 9:
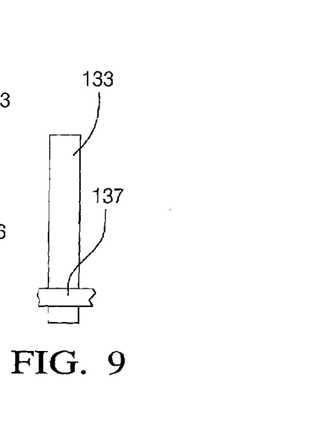
FIG. 9 is a side view of the electrode plate of FIG. 8 showing the conductive material extending over the side of the plate forming side terminals.

In an alternate embodiment, one or more terminal leads may extend from the major electrode portion 124 to the edge 133 or edges 133 and 134 of the electrode plate to form one or more side terminal leads for connecting to side bus lines later provided on the side of the multi-cell stack. In the embodiment shown in FIGS. 8 and 9, electrode 124 has an electrode ink pattern having major electrode 124 and electrical terminal leads 132 extending over the side edge 133 or 134 to form side terminal 135. As discussed in relation to the electrode ink pattern of FIG. 6, a symmetrical electrode ink pattern allows use of a single electrode ink pattern to create the two opposite polarity electrode elements. The termination of electrical leads 132 at the sides 133, 134 of the plate 126 provides a much more flexible method for the electrical connection of the adjacent elements. The double terminal leads 132 provide means for electrical continuity check of the part after the lamination, firing process. In another embodiment, disposing conductive media includes disposing conductive media to form terminal leads may include forming a castellation feature 136 to expose terminal leads adjacent a side edge or edges of the electrode plate; forming bus lines along a side of the multi-cell stack for electrically connecting the laminated co-fired embedded-conductor elements; and filling the castellation feature with dielectric encapsulent. Optional castellation feature 136 may be used to connect adjacent plates by a metal bus bar 137 (partially shown n FIG. 9) applied using a brazing operation or by applying a layer of ink conductor for forming bus lines at the side of the stack, and filling the castellation with dielectric encapsulent. Referring to FIG. 30. the castellation or cut out feature 136 incorporated in the plate 126 can be any shape that will expose the electrode terminal printed on the electrode plate. FIG. 31 illustrates in exploded view a pair of plates 126, 126 with the embedded electrode print extending over the edge of the cut out region 136 and forming an external conductive tab 141 that can be connected such as with conductive ink to form bus paths prior to covering by encapsulent. FIG. 32 shows the pair of plates 126, 126 of FIG. 31 after co-firing and laminating to provide the single laminated co-fired embedded conductor element.

Figure 10:
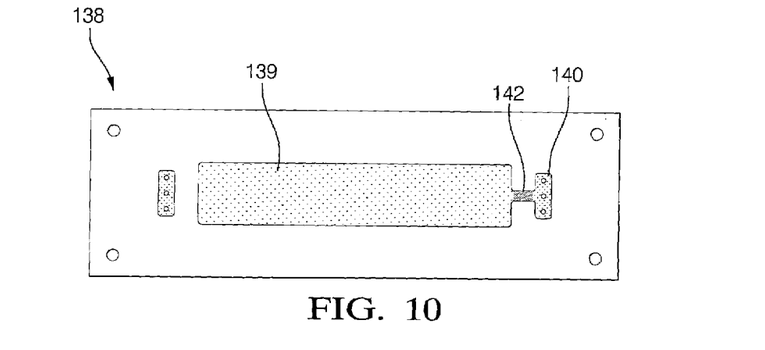
FIG. 10 shows an embodiment using a two-material conductive ink system for the electrode print.
Figure 11:
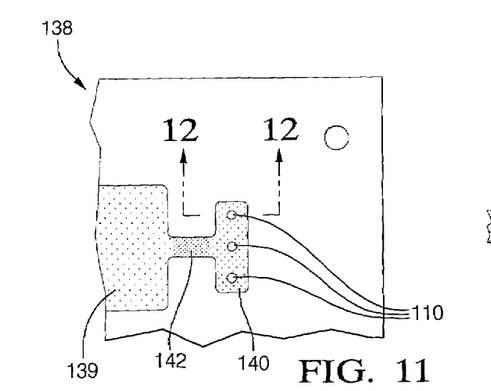
FIG. 11 is an enlargement of a portion of FIG. 10 showing the two-material conductive ink system.
Figure 12:
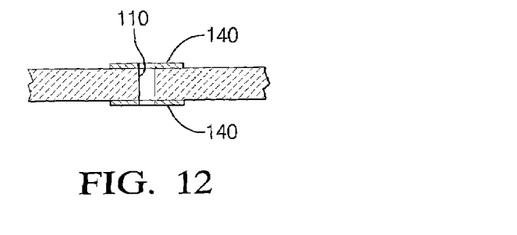
FIG. 12 is a cross-sectional view of a portion of FIG. 11 showing the inked pad for making electrical contact from one plate to another plate.

In an alternate embodiment, the electrode plate may comprise a two-material conductive ink system including a main electrode portion comprising a first conductive material, such as an inexpensive metal prone to oxidation; a via cover pad comprising a noble metal; and a terminal lead overlap area at the interface between the main electrode portion and the via cover pad where the first and second conductive materials overlap. For high temperature application, the conductive material used for the main electrode area may be a low cost material including, but not limited to, tungsten, nickel, molybdenum, and combinations thereof, while a noble metal, such as platinum, may be used to construct the terminal leads. In this embodiment, the method comprises: disposing a first conductive material comprising a metal prone to oxidation on the first ceramic plate to form the main electrode portion; drying the first conductive material; disposing a second conductive material comprising a noble metal on the first ceramic plate to form a terminal lead and an overlap area at the interface between the main electrode portion and the terminal lead wherein the first and second conductive materials overlap. In FIGS. 10–12, an electrode plate 138 having a two-material conductive ink system includes a main electrode area 139 comprising tungsten ink and a conducting terminal lead 142 comprising platinum. The electrode is prepared by printing a layer of tungsten to form the main electrode area 139, drying the tungsten-printed electrode, printing a layer of platinum to form the platinum via cover pads 140 and overlap area (terminal lead) 142 where the platinum overlaps the tungsten. This embodiment advantageously reduces ink material cost while controlling metal oxidation at the terminal lead. FIG. 12 provides a cross-sectional side view of a portion of the plate 138 showing platinum inked cover pad 140 for making electrical contact from one plate to another plate.

Figure 13:
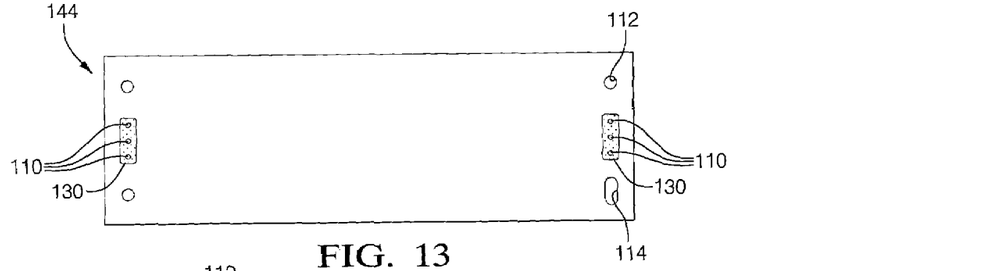
FIG. 13 shows a matching cast ceramic tape or roll compacted ceramic plate having electrical vias, alignment apertures, error-proofing features, and via cover pads used to prepare the present laminated co-fired embedded conductor element.

FIG. 13 shows a matching ceramic plate 144 used to prepare the present laminated embedded conductor element 148. Matching ceramic plate 144 has electrical vias 110 and inked cover pad 130 but is free of any main electrode print.

Figure 14:
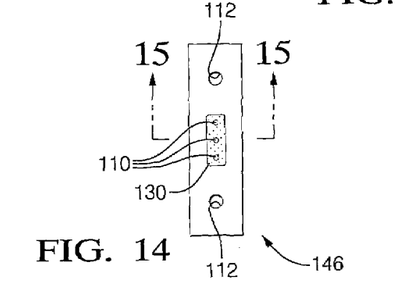
FIG. 14 is a top view of a spacer having electrical vias, alignment apertures, and via cover pad.
Figure 15:
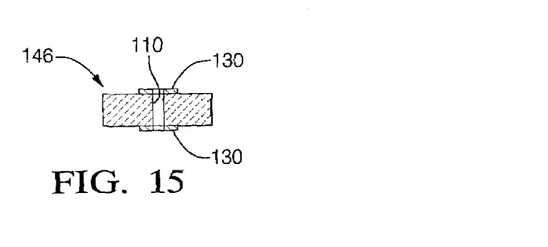
FIG. 15 is a cross-sectional view taken along the line 15—15 of the spacer of FIG. 14.

Spacers 146, shown in FIGS. 14 (top view) and 15 (side sectional view taken along the line 15–15 in FIG. 14) have electrical vias 110 and alignment apertures 112 positioned to coincide with the electrical vias 110 and alignment apertures of electrode plates 126 and matching ceramic plates 144.

Figure 16:
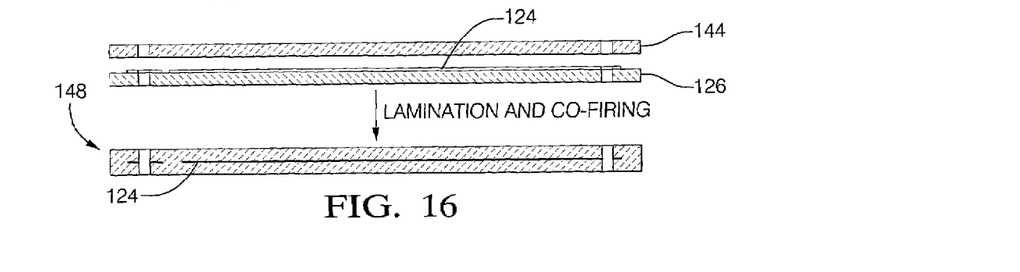
FIG. 16 is a cross-sectional view showing the preparation of a laminated embedded conductor element prepared with an electrode plate and a matching ceramic plate.
Figure 17:
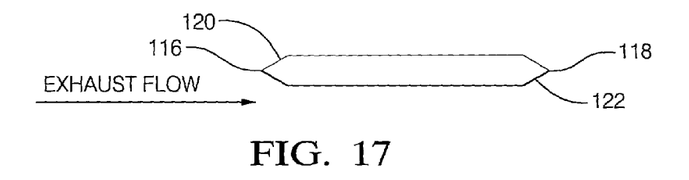
FIG. 17 illustrates the tapered edges of the element of FIG. 16 for facilitating exhaust flow.

Turning to FIGS. 16 and 17, an electrode plate 126 and matching plate 144 pair are laminated together with the ink conductor (electrode 124) sandwiched therebetween. The structure is fired to form laminated embedded conductor element 148. If an oxidation-prone metal is used to prepare the electrode 126, the laminated embedded-conductor element 148 must be fired in a reducing atmosphere, such as in hydrogen gas, to protect the metal from oxidation. Tapered edges 120, 122, illustrated in FIG. 17, minimize exhaust flow resistance through the reactor substrate.

Figure 18:
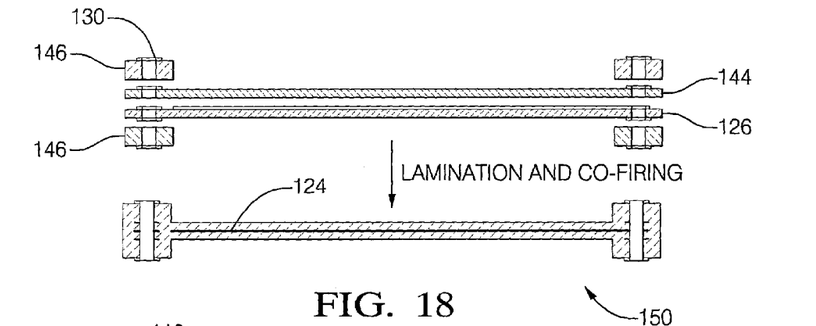
FIG. 18 is a cross-sectional view showing the preparation of an I shaped laminated embedded-conductor element prepared with an electrode plate, a matching ceramic plate, and a plurality of spacers.
Figure 19:
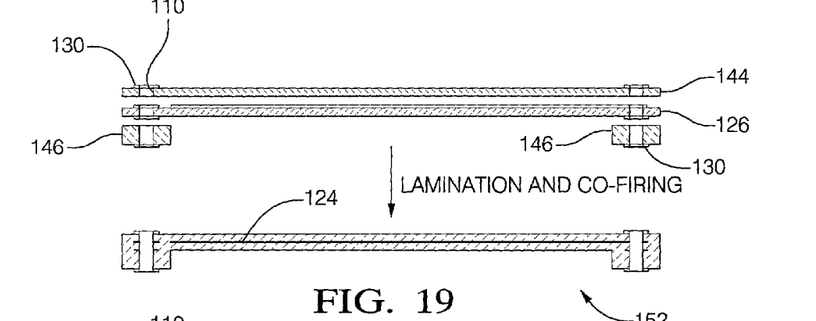
FIG. 19 is a cross-sectional view showing the preparation of a C shaped laminated embedded-conductor element prepared with an electrode plate, a matching ceramic plate, and a plurality of spacers.
Figure 20:
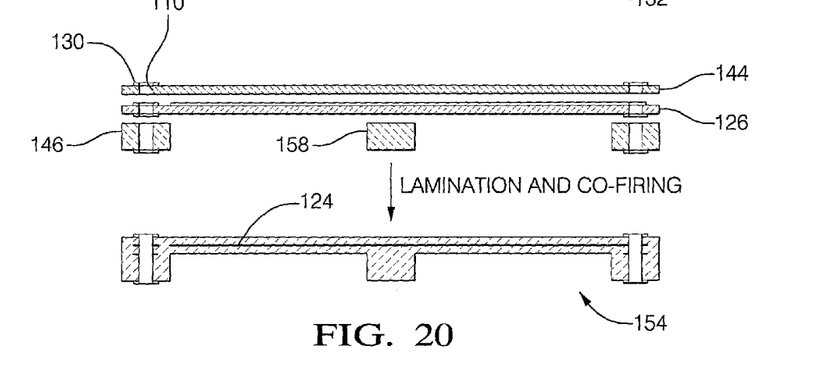
FIG. 20 is a cross-sectional view showing the preparation of an E shaped laminated embedded-conductor element prepared with an electrode plate, a matching ceramic plate, a structural rib, and a plurality of spacers.
Figure 21:
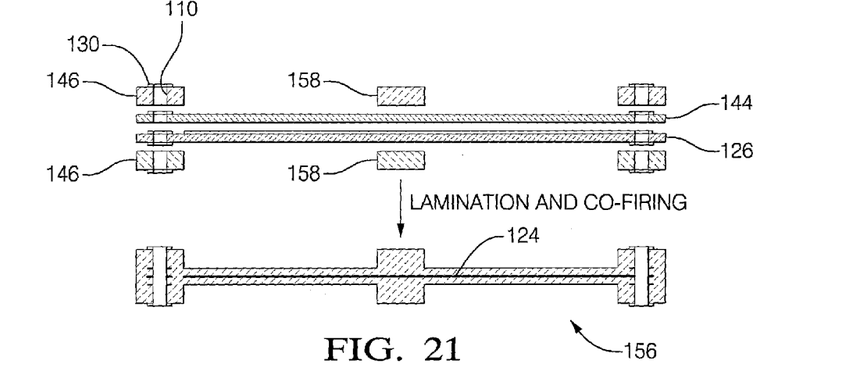
FIG. 21 is a cross-sectional view showing the preparation of a double H shaped laminated embedded-conductor element prepared with an electrode plate, a matching ceramic plate, a plurality of spacers, and structural ribs.

Variously shaped elements may be prepared by combining spacers 146 with electrode plates 126 and matching plates 144 to form a single structure. FIG. 18 shows cast tape or roll compacted spacers 146 at the green stage laminated with electrode plate 126 and matching plate 144 and fired to form laminated embedded-conductor I-shaped element 150. Preparation of a C-shaped laminated embedded-conductor element 152 is shown in FIG. 19. FIGS. 20 and 21 illustrate the preparation of alternately shaped substrates having one or more structural ribs to further strengthen the substrate structure. In FIG. 20, structural ribs 158 are employed to form an E-shaped laminated embedded-conductor element 154. In FIG. 21, structural ribs 158 are employed to form a double H-shaped laminated embedded-conductor element 156. The spacers 146 are pre-inked with cover pads 130 and the electrical vias 110 are pre-filled.

Figure 22:
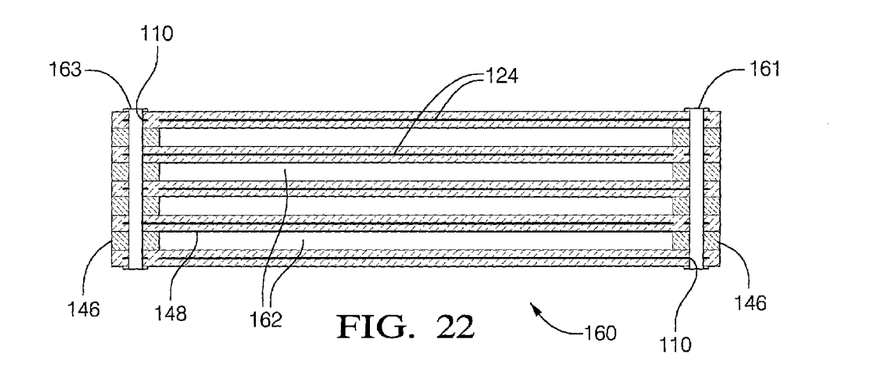
FIG. 22 is a cross-sectional view showing a laminated embedded-conductor multi-cell non-thermal plasma reactor substrate in accordance with the present invention.
Figure 23:
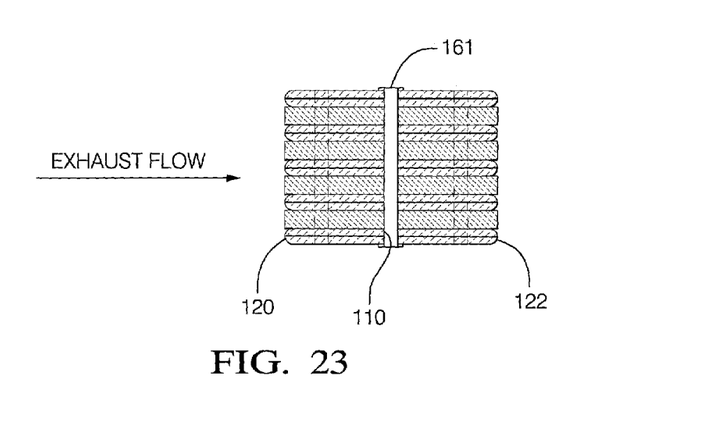
FIG. 23 illustrates the tapered edges of the element of FIG. 22 for facilitating exhaust flow.

FIGS. 22 and 23 show a laminated embedded-conductor multi-cell non-thermal plasma reactor substrate 160. In accordance with one embodiment of the present method, the multi-cell substrate 160 is prepared by stacking a plurality of laminated, co-fired elements 148 with discrete spacers 146 deposited on each side of the plate. Power and ground bus lines 161, 163 are established at the sides of the stack through vias 110 interconnecting the alternating polarity laminated elements 148 to power and ground connections. The stack 160 is bonded together with high temperature glass. Exhaust gas passes through the exhaust gas passages 162 and is treated therein by the corona.

Figure 24:
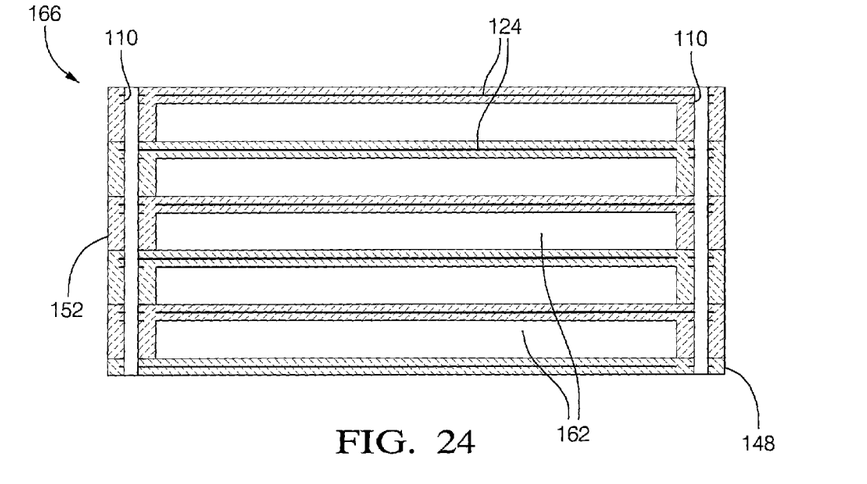
FIG. 24 is a cross-sectional view showing a laminated C shaped embedded-conductor multi-cell non-thermal plasma reactor substrate in accordance with the present invention.
Figure 25:
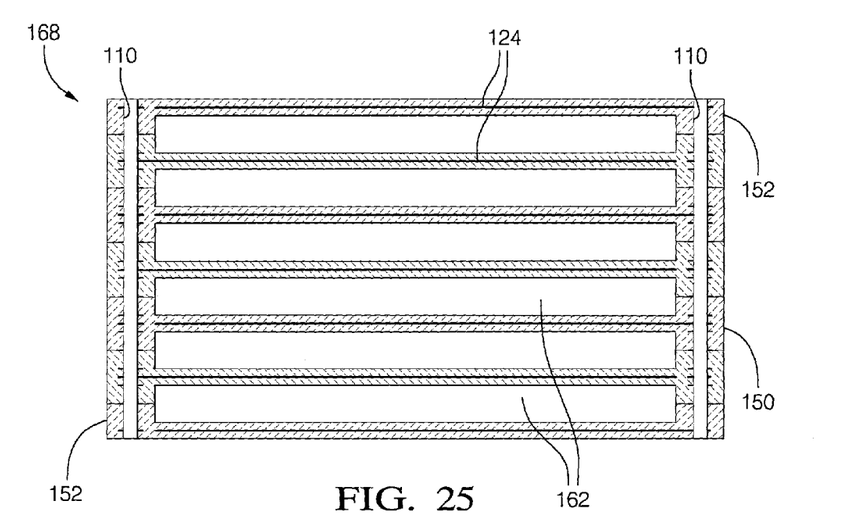
FIG. 25 is a cross-sectional view showing a laminated I shaped embedded-conductor multi-cell non-thermal plasma reactor substrate in accordance with the present invention.
Figure 26:
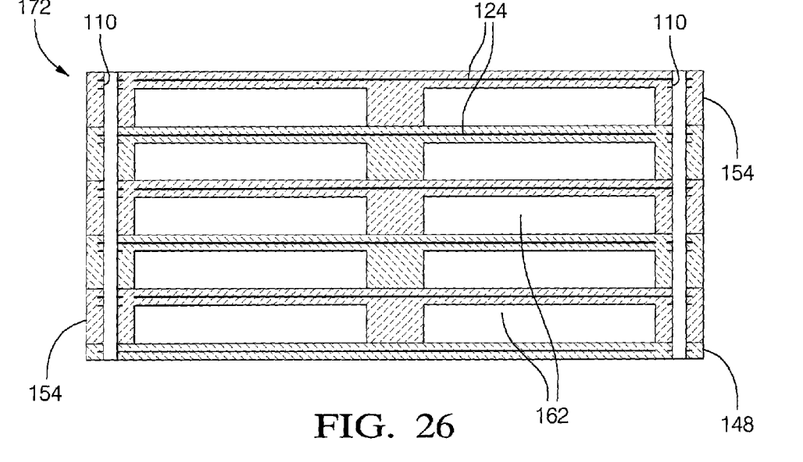
FIG. 26 is a cross-sectional view showing a laminated E shaped embedded-conductor multi-cell non-thermal plasma reactor substrate in accordance with the present invention.
Figure 27:
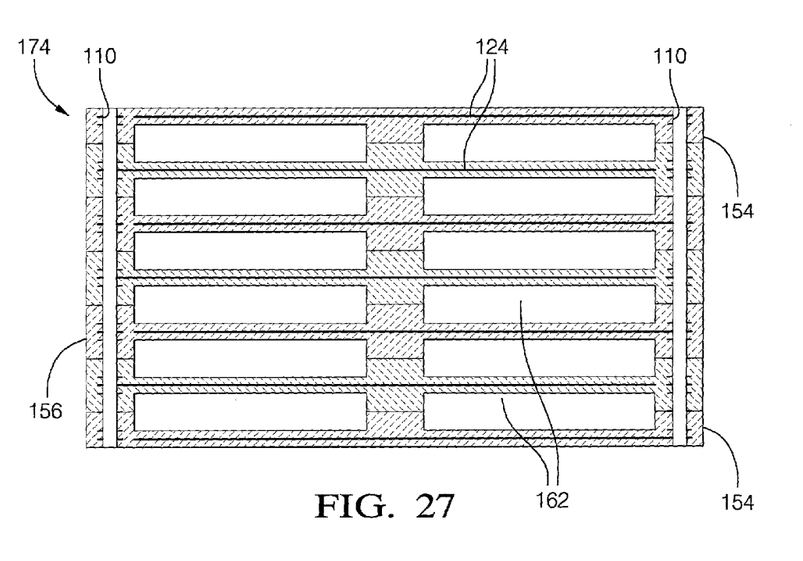
FIG. 27 is a cross-sectional view showing a laminated double H shaped embedded-conductor multi-cell non-thermal plasma reactor substrate in accordance with the present invention.

Alternate embodiments of the present invention include substrates prepared with variously shaped laminated embedded-conductor elements such as C-, I-, E-, and double H-shaped elements. A multi-cell substrate 166 having C-shaped laminated embedded-conductor elements 152 and laminated embedded-conductor element 148 is shown in FIG. 24. FIG. 25 shows a multi-cell substrate 168 having laminated I-shaped embedded-conductor elements 150 and C-shaped embedded conductor elements 152. FIG. 26 shows a multi-cell substrate 172 having E-shaped embedded-conductor elements 154 and laminated embedded-conductor element 148. FIG. 27 shows a multi-cell substrate 174 having double H-shaped embedded-conductor elements 156 and E-shaped embedded conductor elements 154. The stacks are bonded together with high temperature glass.

Figure 28:
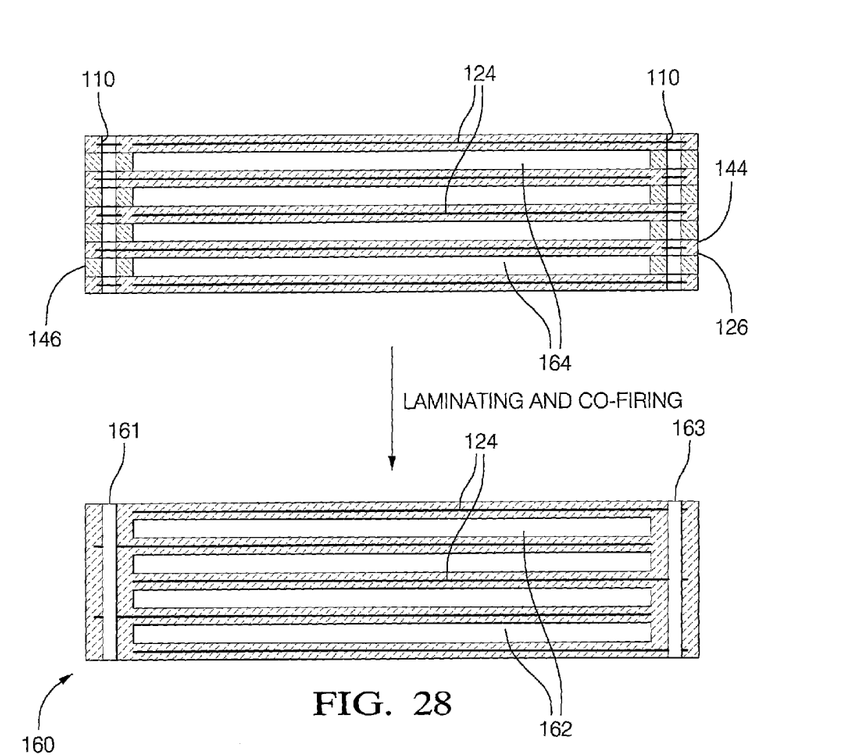
FIG. 28 is a cross-sectional view showing a laminated embedded-conductor multi-cell non-thermal plasma reactor substrate constructed using temporary supports or fugitive material to support the exhaust gas passages (cells) prior to and after firing the stack.

Turning to FIG. 28, an alternate method for preparing the laminated embedded-conductor multi-cell substrate comprises constructing the entire multi-cell stack in the green stage and co-firing to form the substrate. The filling of vias with conductive material may be performed after laminating the entire substrate stack to reduce the number of printings for via cover pads. This embodiment comprises:

stacking electrode plates 126 and matching plates 144;

disposing fugitive material or temporary support structures 164 to create gas channels;

disposing spacers 146 between adjacent embedded-conductor elements 148 to form a multi-cell stack having exhaust gas passages 162 between adjacent embedded-conductor elements 148;

laminating the stack;

removing the temporary supports 164;

and firing the stack to form the laminated embedded-conductor multi-cell substrate 160.

Temporary support 164 may comprise a sacrificing material which burns out in the firing stage or a tool that is withdrawn before firing.

Figure 29:
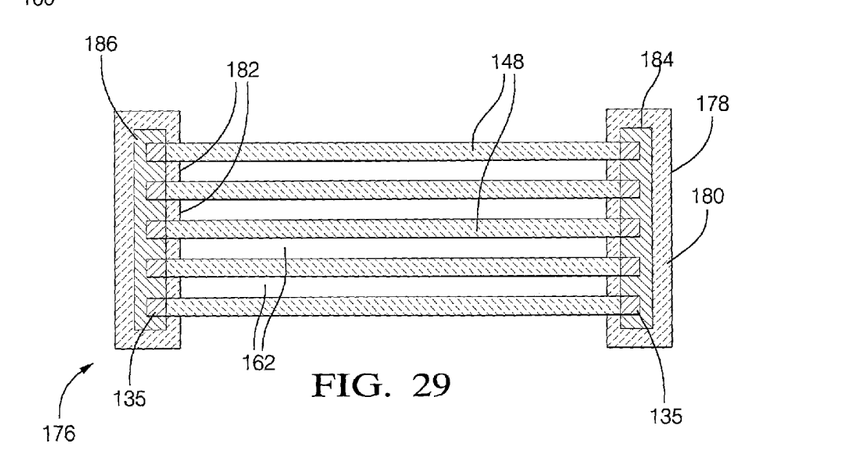
FIG. 29 is a cross-sectional view showing a laminated embedded-conductor multi-cell non-thermal plasma reactor substrate constructed with a laminated, co-fired embedded conductor element and edge connectors.

An alternative embodiment of the present invention includes a laminated embedded-conductor multi-cell non-thermal plasma reactor substrate 176 construction using laminated co-fired embedded-conductor elements 148 and edge connectors 178 as shown in FIG. 29. Edge connectors are taught in commonly assigned U.S. Provisional Application No. 60/249,231, of David E. Nelson, et al., filed Nov. 16, 2000, entitled "Edge-connected Non-thermal Plasma Exhaust After Treatment Device," which is hereby incorporated by reference herein in its entirety. The multi-cell substrate 176 is prepared by stacking a plurality of laminated, co-fired elements 148 with edge connectors 178 disposed on opposite sides of the plates. The edge connectors 178 comprise a backplane 180 and a plurality of tines 182 protruding along at least one major surface of the backplane 180, the plurality of tines 182 being spaced apart from one another at regular intervals so as to form pockets between adjacent tines 182. The elements 148 are disposed within the pockets of the edge connector 178 in an alternating polarity arrangement that defines the presence of at least one dielectric barrier next to a plasma cell with the pockets compliantly engaging opposite ends of the elements 148. Power 184 and ground bus lines 186 are established at the front face of the stack 176 for connecting the alternating polarity laminated elements 148 to power and ground (not shown). Alternately, edge connector tines 182 may have aligning vias in the same manner as spacers 146 for providing electrical interconnection between elements.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A laminated co-fired embedded-conductor element non-thermal plasma reactor multi-cell substrate comprising:

a plurality of laminated co-fired embedded-conductor elements arranged to provide a multi-cell substrate of said laminated embedded-conductor elements having exhaust gas passages formed via spacers disposed between adjacent pairs of said laminated co-fired embedded conductor elements;

wherein each of said laminated co-fired embedded-conductor elements comprises a single integrated element including a first ceramic plate having an electrode disposed thereon and a second ceramic plate, co-fired and laminated together so as to embed and seal said electrode between said first ceramic plate and said second ceramic plate;

and further wherein said plurality of laminated co-fired embedded-conductor elements comprise contiguous ceramic material with no parting line gap or layer of adhesive between said first and second ceramic plates.

2. The laminated co-fired embedded-conductor element non-thermal plasma reactor multi-cell substrate of claim 1, wherein said first ceramic plate and said second ceramic plate have aligning electrical vias filled with conductive media to provide an electrical bus for connecting alternating elements in said multi-cell substrate.

3. The laminated embedded-conductor element non-thermal plasma reactor multi-cell substrate of claim 2, wherein conductive pads are disposed around perimeter portions of said electrical vias to enhance electrical contact between adjacent laminated embedded-conductor elements and provide compliant contact between adjacent laminated co-fired embedded-conductor elements.

4. The laminated co-fired embedded-conductor element non-thermal plasma reactor multi-cell substrate of claim 1, wherein said first ceramic plate and said second ceramic plate comprise cast ceramic tapes or roll compacted ceramic plates.

5. The laminated co-fired embedded-conductor element non-thermal plasma reactor multi-cell substrate of claim 1, wherein said first ceramic plate and said second ceramic plate have tapered edges for facilitating exhaust flow.

6. The laminated co-fired embedded-conductor element non-thermal plasma reactor multi-cell substrate of claim 1, wherein said electrode disposed on said first ceramic plate comprises:

a continuous electrode pattern comprising a main electrode portion and an integral terminal lead extending from said main electrode portion.

7. The laminated embedded-conductor element non-thermal plasma reactor multi-cell substrate of claim 6, wherein said electrode disposed on said first ceramic plate comprises a continuous electrode pattern comprising a main electrode portion and at least one integral terminal lead extending from said main electrode portion to a side edge of said first ceramic plate.

8. The laminated embedded-conductor element non-thermal plasma reactor multi-cell substrate of claim 7, further comprising:
   a cut-out feature provided on a side edge of said second ceramic plate and wherein said at least one terminal lead extends beyond an edge of said cut out feature to provide a conductive tab for connecting to a bus line.

9. The laminated embedded-conductor element non-thermal plasma reactor multi-cell substrate of claim 7, further comprising:
   a conductive material extending from said terminal lead over a side of said first ceramic plate to provide electrical interconnection between adjacent elements.

10. The laminated embedded-conductor element non-thermal plasma reactor multi-cell substrate of claim 7, wherein said at least one terminal lead comprises first and second bus leads extending to opposite side edges of said first ceramic plate and extending over said opposite sides of said first ceramic plate.

11. The laminated embedded-conductor element non-thermal plasma reactor multi-cell substrate of claim 6, further comprising:
   a two-material conductive ink system wherein said main electrode portion comprises a first conductive material;
   a via cover pad disposed over electrical vias provided in said first and second ceramic plates comprises a second conductive material; and
   wherein said terminal lead comprises said first conductive material in an area of said terminal lead connecting said terminal lead to said main electrode portion and wherein said terminal lead comprises said second conductive material in an area of said terminal lead connecting said terminal lead to said electrical vias.

12. The laminated embedded-conductor element non-thermal plasma reactor multi-cell substrate of claim 11, wherein at least a portion of said terminal lead comprises an overlap area wherein both of said first conductive material and said second conductive material overlap one another.

13. The laminated co-fired embedded-conductor element non-thermal plasma reactor multi-cell substrate of claim 1, wherein said laminated co-fired embedded-conductor element comprises an I-shaped element, a C-shaped element, an E-shaped element, or a double H-shaped element.

14. The laminated co-fired embedded-conductor element non-thermal plasma reactor multi-cell substrate of claim 1, wherein said spacers comprise edge connectors disposed on opposite sides of said elements;
   said edge connectors comprising a backplane and a plurality of tines protruding along at least one major surface of said backplane, said plurality of tines being spaced apart from one another at regular intervals so as to form pockets between adjacent tines;
   and wherein said elements are disposed within said pockets of said edge connectors in an alternating polarity arrangement with said pockets compliantly engaging opposite ends of said elements.

* * * * *